United States Patent
Brown et al.

(10) Patent No.: US 8,429,413 B2
(45) Date of Patent: *Apr. 23, 2013

(54) SYSTEMS AND METHODS FOR SERVER AIDED PROCESSING OF A SIGNED RECEIPT

(75) Inventors: Michael K. Brown, Fergus (CA); Neil Adams, Kitchener (CA); Michael S. Brown, Kitchener (CA); Luis Estable, Gatineau (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/118,513

(22) Filed: May 30, 2011

(65) Prior Publication Data

US 2011/0258446 A1 Oct. 20, 2011

Related U.S. Application Data

(63) Continuation of application No. 11/972,463, filed on Jan. 10, 2008, now Pat. No. 7,975,144.

(51) Int. Cl.
*H04L 9/32* (2006.01)
*G06F 7/04* (2006.01)

(52) U.S. Cl.
USPC .............................. 713/176; 173/180; 726/14

(58) Field of Classification Search .................. 713/176, 713/180; 726/14
See application file for complete search history.

(56) References Cited

U.S. PATENT DOCUMENTS

| | | | |
|---|---|---|---|
| 7,353,204 B2 | 4/2008 | Liu | |
| 7,360,079 B2 | 4/2008 | Wall | |
| 7,380,126 B2 * | 5/2008 | Logan et al. .................. | 713/176 |
| 7,698,558 B2 * | 4/2010 | Tomkow ........................ | 713/176 |
| 7,788,485 B2 | 8/2010 | Connell | |
| 7,814,313 B2 | 10/2010 | Riittinen | |
| 7,827,406 B2 | 11/2010 | Brown et al. | |
| 7,840,207 B2 | 11/2010 | Adams et al. | |
| 7,886,144 B2 | 2/2011 | Brown et al. | |
| 7,949,876 B2 * | 5/2011 | Haddad ........................ | 713/171 |
| 2002/0091927 A1 | 7/2002 | Wall | |
| 2002/0169954 A1 | 11/2002 | Bandini et al. | |
| 2004/0073790 A1 | 4/2004 | Ateniese et al. | |
| 2004/0128508 A1 | 7/2004 | Wheeler et al. | |
| 2006/0041754 A1 * | 2/2006 | Hind et al. ..................... | 713/176 |
| 2006/0112419 A1 | 5/2006 | Brown et al. | |
| 2007/0123217 A1 * | 5/2007 | Adams et al. .............. | 455/412.1 |
| 2007/0143619 A1 | 6/2007 | Goodman et al. | |
| 2008/0120504 A1 | 5/2008 | Kirkup et al. | |
| 2008/0162936 A1 | 7/2008 | Haddad | |
| 2009/0034729 A1 | 2/2009 | Brown et al. | |

* cited by examiner

*Primary Examiner* — Krisna Lim
(74) *Attorney, Agent, or Firm* — Ridout & Maybee LLP

(57) ABSTRACT

A method for processing security communication protocol compliant signed receipts at a mobile communication device linked to a host system is provided. The host system receives an email message linked to a digital signature, and a signed receipt. The host system redirects the signed receipt to the mobile communication device. The host system determines if the email message is available at the mobile communication device, and if not, the host system retrieves the email message and redirects the email message to the mobile communication device. The mobile communication device can then verify the signed receipt based on the email message. Optionally, rather than the email message, the host system retrieves and/or recalculates data elements associated with the email message and required to verify the signed receipt, and redirects these data elements to the mobile communication device. A related system is provided, as well as server computer program for the host system, and device computer program for the mobile communication device.

25 Claims, 5 Drawing Sheets

Figure 5: GPRS Device
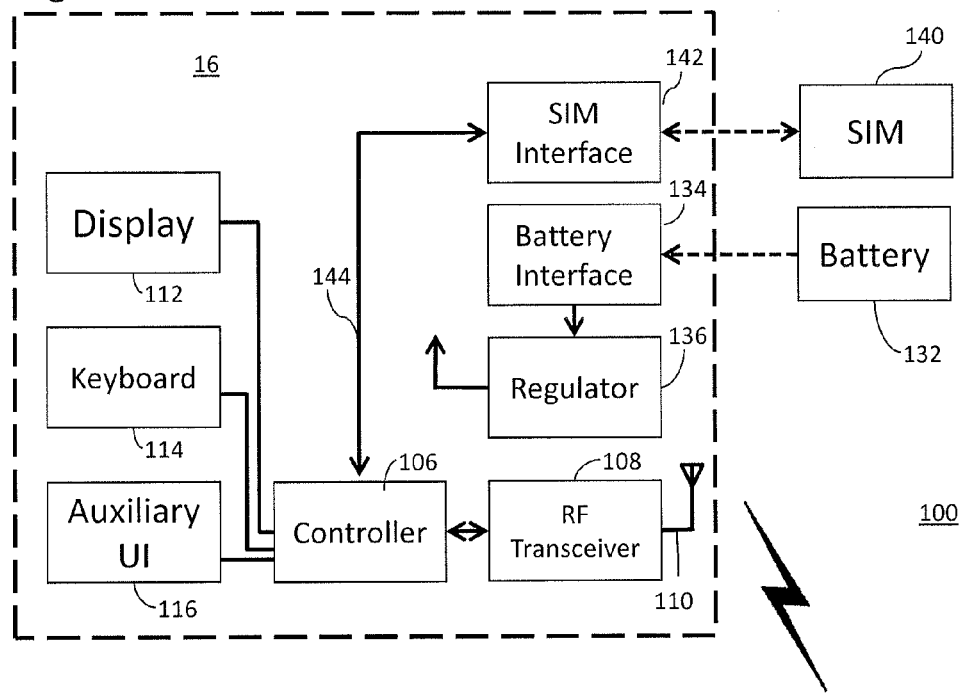
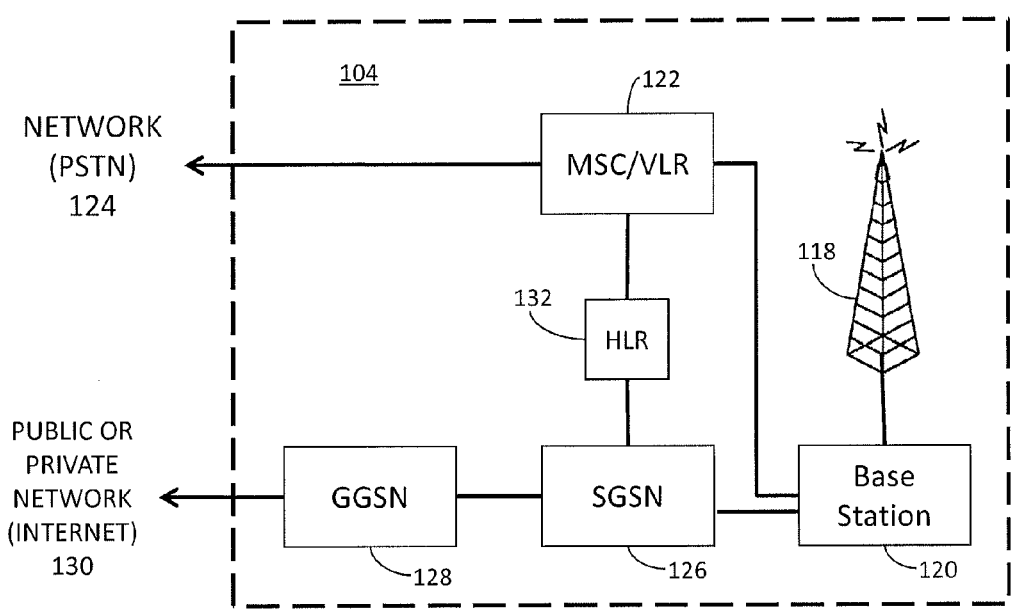

SYSTEMS AND METHODS FOR SERVER AIDED PROCESSING OF A SIGNED RECEIPT

RELATED APPLICATIONS

This application is a continuation of U.S. patent application Ser. No. 11/972,463 filed on Jan. 10, 2008, and issued on Jul. 5, 2011, as U.S. Pat. No. 7,975,144.

FIELD OF THE INVENTION

This invention relates in general to secure mobile communication solutions, and more particularly to secure messaging protocol compliant mobile communication solutions.

BACKGROUND OF THE INVENTION

One of the aspects of secure messaging protocols, including the S/MIME standard is the use of signed receipts. The receipt is generally bound to an S/MIME message through an associated digital signature. Accordingly, signed receipts only pertain to signed S/MIME messages. Returning a signed receipt to a sender of the message serves to provide proof of delivery of the message, and allows the sender to demonstrate to a third party that the recipient was able to verify the digital signature of the original message so as to authenticate the sender and/or authenticate data included in the message. This is particularly important in processes that are dependent on authentication and non-repudiation such as processes related to e-commerce or other communications or transactions where authentication or non-repudiation may be a factor.

BRIEF DESCRIPTION OF THE DRAWINGS

A detailed description of the preferred embodiment(s) is(are) provided herein below by way of example only and with reference to the following drawings, in which:

FIG. 5 is a block diagram of a communication system that includes the mobile communication device of the present invention.

Figure 1:
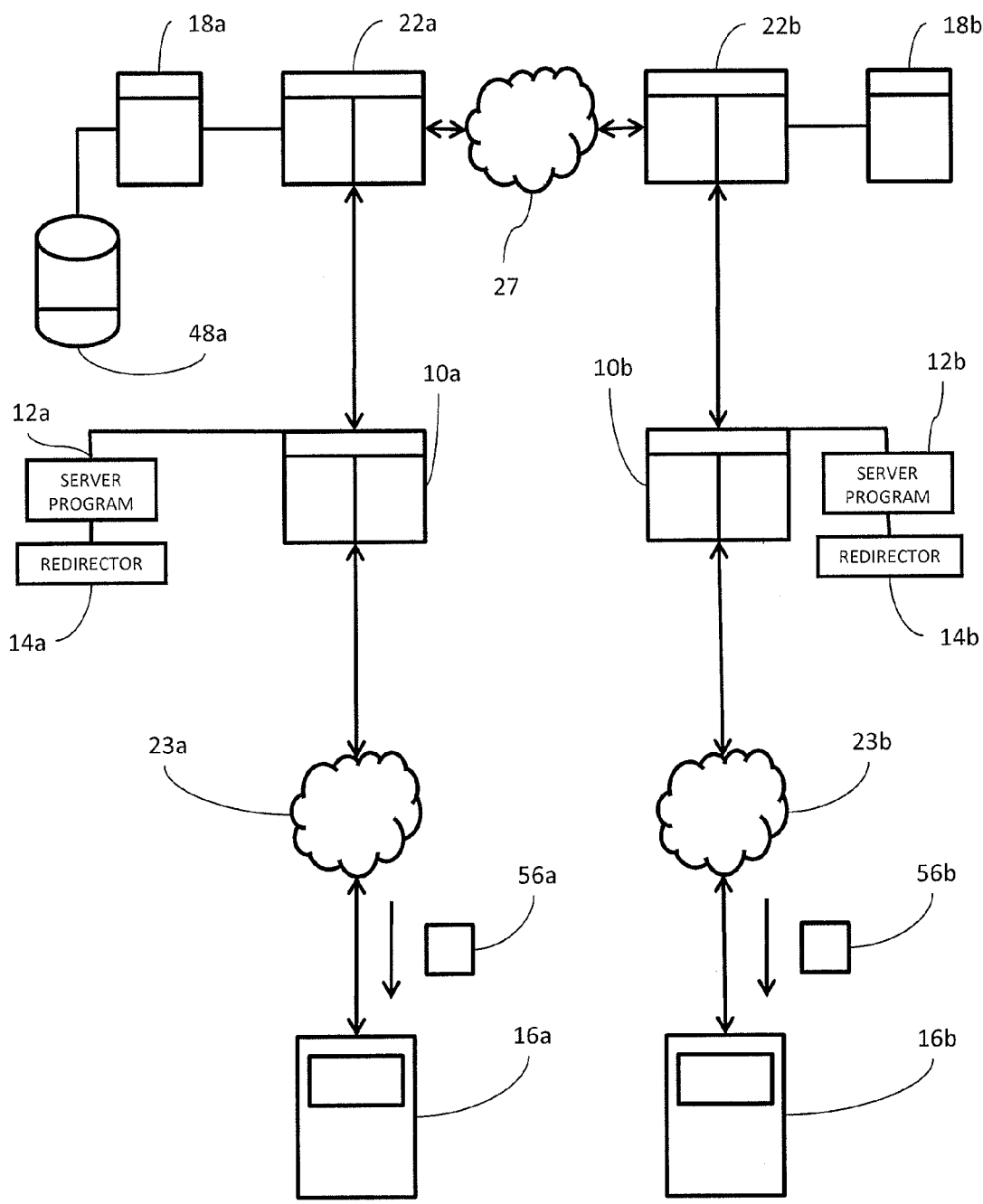
FIG. 1 is a block diagram of the system that illustrates that the system is operable to redirect the original message to the mobile communication device, in accordance with one aspect of the present disclosure.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION

In a first aspect of the present disclosure, a method of processing security communication protocol compliant signed receipts at a mobile communication device linked to a host system is provided. The host system is operable to send and receive messages, including security communication protocol compliant messages, and to redirect the messages and other data to the mobile communication device. The method includes:

(a) sending from the host system an email message with an associated digital signature;
(b) receiving a signed receipt at the host system, the signed receipt confirming that a recipient has received from a sender the email message;
(c) the host system redirecting the signed receipt to the mobile communication device;
(d) the host system determining whether the email message is available at the mobile communication device, and if the email message is not available at the mobile communication device, the host system retrieving the email message and redirecting the email message to the mobile communication device; and
(e) verifying the signed receipt at the mobile communication device based on the email message.

In a second aspect of the method of the present disclosure, the host system determines whether the original S/MIME message is available at the mobile communication device, and if the original S/MIME message is not available at the mobile communication device, the host system retrieves and/or recalculates data elements associated with the original S/MIME message and required to verify the signed receipt and redirects these data elements to the mobile communication device. The signed receipt is then verified at the mobile communication device based on the data elements.

The system of the present disclosure, in one aspect thereof, consists of a system for processing security communication protocol compliant signed receipts from a mobile communication device that includes:

(a) a host system linked to the mobile communication device, the host system being operable to send and receive messages, including security communication protocol compliant messages, and to redirect the messages and other data to the mobile communication device; wherein the host system is operable to:
(b) receive an email message linked to a digital signature;
(c) receive a signed receipt, the signed receipt confirming that a recipient has received from a sender the email message;
(d) redirect the signed receipt to the mobile communication device; and
(e) if the email message is not available at the mobile communication device, retrieve the email message and redirect the original email message to the mobile communication device for verification of the signed receipt based on the email message by operation of a security communication utility linked to the mobile communication device.

In another aspect of the present disclosure, a further system is provided consisting of a mobile communication device that includes the signed receipt verification technology of the present disclosure.

A computer program product is provided, which in one aspect thereof consists of a server computer program for providing the security communication server utility of the present disclosure.

In another aspect of the computer program product, a computer program is provided that resides on the mobile communication devices and provides the server security communication device utility of the present disclosure.

For clarity, in this disclosure a "sender" refers to an originator of a message in regard to which a request for a receipt has been made. The "recipient" is the party that received that message and generated the receipt. In other words the "sender" receives the signed receipt, and the "recipient" sends the signed receipt.

In order to address the need for email security, S/MIME (Secure Multipurpose Internet Mail Extension) protocol was established by RSA Data Security and other software vendors approximately in 1995. The goal of S/MIME was to provide message integrity, authentication, non-repudiation and privacy of email messages through the use of PKI (Public Key Infrastructure) encryption and digital signature technologies. Applications that support S/MIME are assured that third parties, such as network administrators and ISPs, cannot intercept, read or alter their messages. S/MIME functions primarily by building security on top of the common MIME protocol, which defines the manner in which an electronic message is organized, as well as the manner in which the electronic message is supported by most email applications.

Advanced mobile communication devices now permit users to access computer based services such as electronic mail service in more flexible ways and at more flexible times. Such mobile communication devices are typically coupled with a host system via a wireless network and one or more fixed networks. Email and other information are typically stored on the host system. In server implementations the host system is provided by a server, and optionally a desktop is coupled to the server from which emails and other data are also accessible. One of the functions of the server in this implementation is to provide wireless synchronization as between data elements on the mobile communication device and optionally data elements on the desktop computer. Alternatively, in another server implementation, the host system is coupled to one or more servers (such as an email server), and the host system provides wireless synchronization between the one or more servers and the mobile communication device.

An example of an advanced mobile communication solution provides an end-to-end solution that integrates with the user's e-mail account. This solution typically includes a redirector program operating at the host system that enables a user to redirect or mirror certain user-selected data items (or parts of data items) from the host system to the mobile communication device upon detecting that one or more user-defined triggering events has occurred. The host system is operable to repackage these data items (or parts thereof) in a manner that is transparent to the mobile communication device, so that information on the mobile communication device appears similar to information on the user's host system. The redirector program also provides a series of functions related to the management of the type of interactions between the host system and the mobile communication device that are supported including: (1) the types of user data to redirect including a preferred list of message types that are to be redirected or preferred senders whose messages are to be redirected, (2) configuring the system to respond to internal, external and networked triggering events, (3) transparent repackaging of the user data items in a variety of ways such that the mobile data communication device appears as though it were the host system, (4) integration with other host system components such as e-mail, TCP/IP, keyboard, screen saver, web pages and certain programs that either create user data items or can be configured to provide trigger points for processes or functions supported by a solution, and (5) the ability to operate locally on a user's desktop system or at a distance via a network server.

It is common for such advanced mobile communication solutions to provide secure information transport between the host system and the mobile communication device.

Secure messaging protocols, such as the S/MIME standard, may include a signed receipt or equivalent, which may be processed so as to prove to a sender that a message has received, or allow the sender to demonstrate to a third party that the recipient was able to verify a digital signature associated with the original message so as the authenticate the sender, a message, or particular content of the message.

A problem is presented in deploying an advanced mobile communication solution such as the one described earlier where the original message may not be available on the mobile communication device, consequently, therefore the sender may not be able to process a signed receipt as previously described because the required digital signature in accordance with the applicable secure messaging protocol is associated with the original message. The original message may not be available because, for example, (i) the original message was deleted by the sender, (ii) the message was automatically deleted by the mobile communication device and/or (iii) the original message was not sent to the mobile communication device. This lack of access of the original message in these circumstances constitutes an impediment to deployment of solutions to a mobile communication device where authentication of the sender, a message, or particular content of the message is possible from the mobile communication device.

What is needed is a system, method and computer program that addresses the aforesaid problems and permits the verification of signed receipts from a mobile communication device, even when the associated original message is resident on a desktop computer or email server. The need for such a system, method and computer program has existed for some time. The present disclosure meets this requirement in an efficient manner.

It should be understood that it is increasingly desirable in advanced mobile communication to incorporate Public Key Infrastructure (PKI) type technology for encryption, authentication, and non-repudiation purposes. PKI based systems employ an encryption key pair, such as a decryption private key and an encryption public key to decrypt and encrypt data. The encryption public key is typically available from a public key certificate store such as that provided by a Certificate Authority. The decryption private keys are secret keys that are protected by the use of encryption and other techniques to help ensure that an attacker cannot readily obtain this critical key.

PKI systems can additionally employ digital signing key pairs, such as a signing private key and a signing public key to allow the use of digital signatures so that email, electronic contracts and other data may be uniquely and securely signed by an individual. Such systems are sometimes referred to as dual public key system. Some dual public key systems generate and use a separate digital signature certificate and a separate encryption certificate that is sent with encrypted data or digitally signed data. The separate certificates contain the public key data along with certificate expiry data, and other data, as known in the art. Other dual public key systems use a single certificate that contains both the signature verification public key and the encryption public key.

Some standards exist that set forth particular requirements so that subscribers can communicate securely with one other, such as the revised versions of the Secure Multipurpose Internet Mail Extensions (S/MIME) standard. With such standards, header data (having fields defined by the S/MIME standard) is included in an encrypted message that typically includes key identifying data, thereby allowing a recipient to determine which private decryption key is to be used for a particular S/MIME process such as decrypting the encrypted message data, or authentication of data or a sender or recipient. It should be understood that while the present invention explains the invention by reference to the S/MIME standards, this is but one example of a secure messaging platform in relation to which the present disclosure may be implemented. Another example of a secure messaging standard is PGP.

FIG. 1 illustrates the system of the present disclosure in one aspect thereof. FIG. 1 illustrates system components associated with a sender (10a, 12a, 14a and so on) and the system components associated with a recipient (10b, 12b, 14b and so on), in connection with a particular message, to illustrate the processing of a signed receipt involving a sender and a recipient as described in this disclosure. For clarity, system components illustrated in FIG. 1 function may be associated with both a sender and recipient, as described below, they are associated with only a sender and only a recipient merely for purposes of illustration of the invention in relation to a particular message where one party is the sender and another party the recipient. The system may include a server or host system (10a,b) that operates a server program (12a,b) that may include a redirector program (14a,b), the redirector program (14a,b) being operable to redirect data including emails, images, or attachments (referred to in this disclosure as "messages and other data") to one or more mobile communication devices (16a,b). The server (10a,b) may also operate other software components, or may be linked to other computers (not shown) operating other software components, so as to co-operate with the mobile communication device (16a,b) to provide access from the mobile communication device (16a,b) to a range of functions (including email functionality) and services. The server (10a,b) may also be operable to integrate a desktop computer (18a,b) to provide an end-to-end advanced mobile communication solution by providing integration of the various software components operated by server (10a,b) or linked to the server (10a,b) (such as a calendar, email, document management, customer relationship management, etc.) with the mobile communication device (16a,b) and also optionally with the desktop computer (18a,b). The server (10a,b) may be operable to define the allocation of tasks and resources related to such software components as between the communication device (16a,b) and the desktop computer (18a,b). Alternatively, the desktop computer (18a,b) may not need to be involved at all, in which the server (10a,b) is operable to provide integration of the functions (including email functionality) and services associated with the server (10a,b) or computers linked to the server (10a,b) (not shown) and the mobile communication device (16a,b).

The mobile communication device or device (16a,b) may be a hand-held two-way wireless paging computer, a wirelessly enabled palm-top computer, a mobile telephone with data messaging capabilities, or a wirelessly enabled laptop computer, but could be any type of mobile data communication device capable of sending and receiving messages via a network connection (not shown). The device (16a,b) may include a device program (not shown) including computer program instructions that work in conjunction with the server (10a,b) and in particular with the redirector program (12a,b) to enable the seamless, transparent redirection of user-selected data items.

The device (16a,b) typically includes a number of components not specifically illustrated in the Figures. As illustrated in FIG. 1, these components may typically enable the device (16a,b) to communicate with a wireless network (23a,b), and through a wireless gateway (not shown) to the Internet. The server (10a,b) may also be connected to the Internet (27) as well as to a Local Area Network ("LAN") (not shown). The desktop computer (18a,b) may also be connected to the LAN. The components of the device (16a,b) may include a wireless transceiver system (not shown) and a wired communication interface (not shown). The wireless transceiver system may allow the device (16a,b) to communicate with the wireless network (23a,b). The wired communication interface may include, for example, an Ethernet port (not shown) that allows the device (16a,b) to network directly or through an intermediate network to the server (10a,b). The wired communication interface may also include USB or other communication interfaces. A wireless communication interface such as BLUETOOTH™ may also be used. The communication interface may be utilized to provide synchronization as between the device (16a,b) and the desktop computer (18a,b). Alternatively, the desktop computer (18a,b) may connect to the server (10a,b) to provide synchronization as between the device (16a,b) and the server (10a,b). As another alternative, synchronization as between the server (10a,b) and the device (16a,b) may be achieved on a wireless basis without the need for the Ethernet port or equivalent.

The configuration of the system illustrated in FIG. 1 may be particularly advantageous for use with message servers (22a,b) such as Microsoft's Exchange Server, Lotus' Domino Server, or Novell's GroupWise Server, which are normally operated so that all user messages are kept in one central location or mailbox store on the message server (22a,b) instead of in a store within each user's desktop computer (18a,b). This configuration may have the additional advantage of allowing a single system administrator to configure and keep track of all users having messages redirected by operation of the system described herein. Also, the messaging keys that are part of redirector program (14a,b) may be stored in one location for management and update purposes. In addition, the system administrator can manage applicable permissions such as whether users associated with particular devices (16a,b) can open certain attachments or not.

Figure 2:
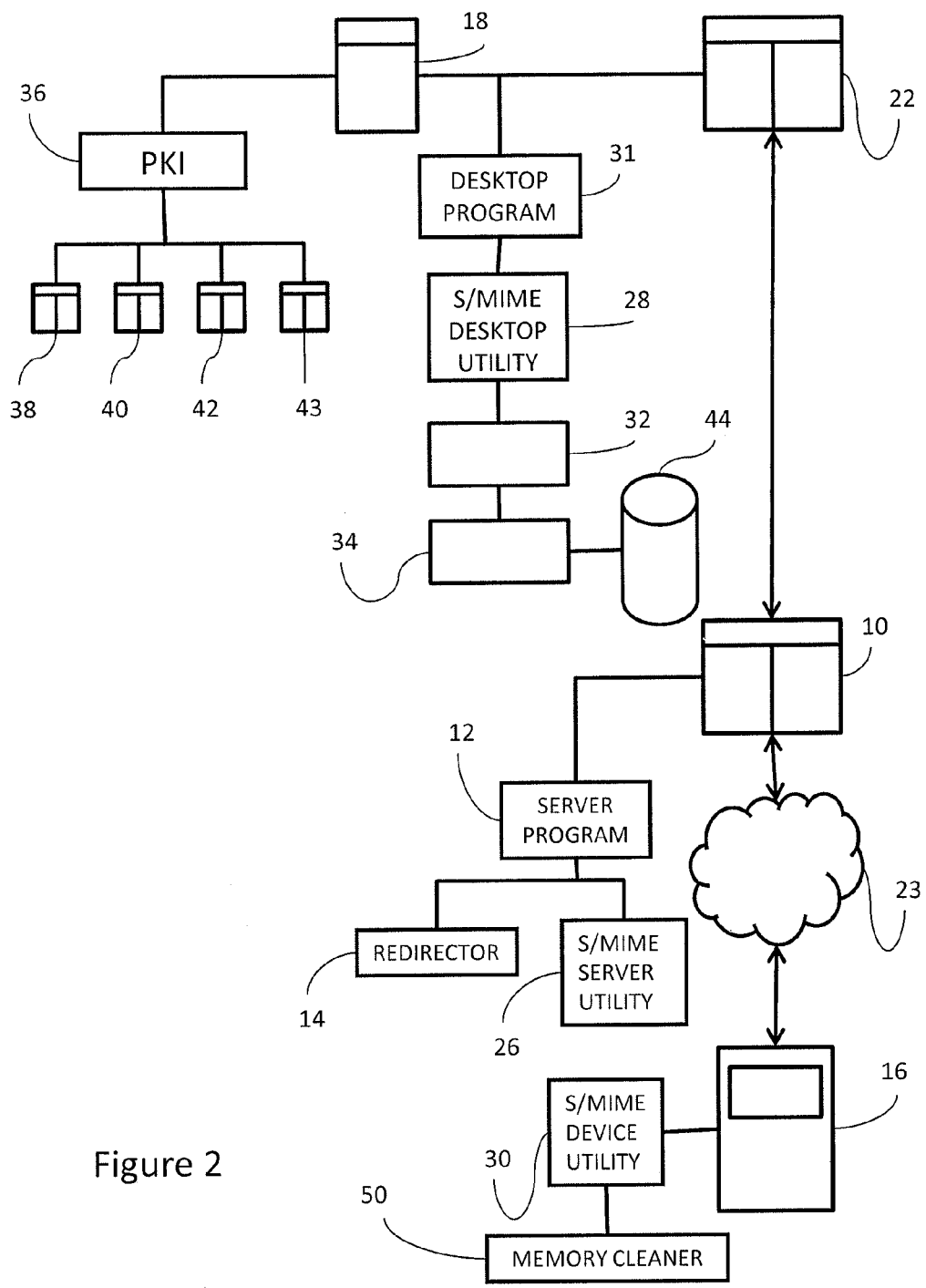
FIG. 2 is a further block diagram of the system illustrating the components of the S/MIME utility of the present disclosure.

FIG. 2 best illustrates that the system may include a series of software components that provide the S/MIME functionality of the present disclosure. These software components are collectively referred to as the S/MIME utility or security communication utility (not shown) of the present disclosure and in a particular implementation of the present disclosure the S/MIME utility may include: (A) an S/MIME server utility (26) or security communication server utility that is part of, or linked to, the server program (12); (B) optionally, an S/MIME desktop utility (28) that is part of, or linked to, a desktop program (31) loaded on the desktop computer (18); and (C) an S/MIME device utility or S/MIME handheld utility (30) or security communication device utility that may be part of, or linked to, the device program. Alternatively, the S/MIME utility may consist only of the S/MIME server utility (26) and the S/MIME device utility (30).

The S/MIME utility typically interoperates with S/MIME email clients including MICROSOFT® OUTLOOK® and MICROSOFT® OUTLOOK EXPRESS®, LOTUS NOTES®, or NOVELL® GROUPWISE® or other similar email clients. Additionally, the system of the present disclosure interoperates with popular PKI systems including NETSCAPE®, ENTRUST® and MICROSOFT® and their Certificate Authorities.

In a particular aspect of the present disclosure, the redirector program (14a,b) (illustrated in FIG. 1) is operable to permit an authorized system administrator to enable the S/MIME server utility (26) (or certain functions thereof) and thereby enable the server (10) to support the transport of S/MIME encrypted messages to devices.

Regarding the desktop program (31), as shown in FIG. 2, the S/MIME utility may provide on the desktop computer (18) the S/MIME desktop utility (28), which may include a certificate and private key management utility (32). This certificate and private key management utility (32) may be operable to: (A) enable users to obtain certificates; (B) download certificates to their device; and (C) to verify the authenticity of certificates. The certificate and private key management utility (32) may include a certificate synchronization manager (34), which is further particularized below.

In a typical implementation, as illustrated in FIG. 2, certificate information may be transported across the organization's LAN to the PKI infrastructure (36), which typically may include: at least one Certificate Authority ("CA") server (38), at least one Lightweight Directory Access Protocol ("LDAP") server (40), at least one Online Certificate Status Protocol ("OCSP") server (42) and at least one Certificate Revocation List ("CRL") server (43) and the desktop computer (18). In the case of the desktop computer, transportation of certificate information may be achieved by operation of the certificate synchronization manager (34). In particular, the certificate synchronization manager (34) may interoperate with the S/MIME server utility (26) to provide a synchronization process for synchronizing digital certificates and encryption keys, in compliance with the S/MIME standard. The S/MIME desktop utility (28) may create on the desktop computer (18) a desktop key store (44) that includes a trusted key store (not shown). The S/MIME desktop utility (28) may enable users to add and delete certificates, check the certificate status, and move certificates to the trusted key store. Generally speaking, it may be that only certificates with explicitly or implicitly trusted Certificate Authorities are stored to the trusted key store.

Device (16) may have a local memory (not shown) in which data and programs may be stored. The local memory may include a handheld key store (48) as shown in FIG. 1. The handheld key store (48) may include the user's private key and the public keys of other individuals. Users may be able to view keys in a key store browser (not shown) linked to the handheld key store (48). The S/MIME handheld utility (30) (shown in FIG. 2) may be operable to permit users to add and delete encryption keys and digital certificates.

In accordance with the present disclosure, in one aspect of the S/MIME handheld utility (30) a memory cleaner (50) may be preferably loaded on the device (16) that is operable to clean the local memory (46) and in particular certain components thereof including an S/MIME memory component, a temporary key store, and a clipboard that may contain decrypted content. These specific components of the local memory are not illustrated in the Figures. The memory cleaner (50) may be operable to remove such decrypted content from each of such memory components, in a manner that is known.

Wireless support for certificate look up and validation from the device (16a,b) is available by operation of the server (10a,b) (illustrated in FIG. 1). This functionality is provided by virtue of interoperation between the device (16a,b) and the server (10a,b). Specifically, the S/MIME handheld utility (30) may be operable to query the LDAP servers (40) (as shown in FIG. 2) to locate specific certificates and download certificates from the search results. Queries are typically based on searches that include the certificate holder's first name, last name or email address. The S/MIME handheld utility (30) may be operable to store a selected certificated downloaded from the LDAP servers (40) to the handheld key store (48).

The S/MIME utility may also optionally provide various other S/MIME related features.

The S/MIME utility may support the use of signed receipts in accordance with the S/MIME standard. In particular, the S/MIME utility may be operable on the device to indicate that either: (A) a signed receipt was requested, or (B) a signed receipt was sent.

In a particular aspect of the present disclosure, when a user first synchronizes an S/MIME enabled device (i.e. the device (16) shown in FIG. 2, including the S/MIME handheld utility (30)) an S/MIME support enabled server (10) (i.e. a server (10) including or linked to the redirector program (14) and the S/MIME server utility (26) in which the redirector program (14) may be configured for processing S/MIME messages, as shown in FIG. 1) defines for the user a mailbox on the message server (22) for which S/MIME support is enabled. Administrative users of the server (10) can disable S/MIME service at the mailbox level to prevent message delivery, if necessary. The S/MIME server utility (26) may also provide software components that enable an administrative user to configure PKI server connections by operation of a mobile data service administration utility (not shown). The mobile data service administration utility may provide a secure gateway (not shown) between the wireless network (23), any LANs (29) and the Internet (27). It also may provide standard HTTP and TCP/IP connections from devices (16) to the PKI infrastructure (36) described above. The mobile data service administration utility may also be operable to enable an administrative user to configure the LDAP server (40) and to configure the OCSP server (42).

The server program (12) may also define on the server (10) an administration utility (not shown) that permits administrative users to define and apply one or more IT policies for handling S/MIME compliant messages, as is common in S/MIME implementations.

In a particular aspect of the S/MIME utility, the system of the present disclosure may be operable to provide to the device (16) the information required to process a signed receipt (56) (shown in FIG. 1), even if the original message (and digital signature embodied in the original message) may not be available on the device (16).

As is well known, when an S/MIME compliant message is created, the sender's private key is used to encrypt a hash (or digest) of the message, and the resulting bit string is attached to the message as a digital signature. The digital signature is verified by using the sender's public key to decrypt the hash of the message and then independently creating a hash of the message and comparing the two. Because it is computationally infeasible for two distinct messages of any length to have the same hash, the comparison enables the verification that the message is unaltered.

Returning a signed receipt (56) provides to the sender proof of delivery of a message, and allows the sender to demonstrate to a third party that the recipient was able to verify the signature of the original message. This signed receipt (56) is typically linked to the original message through the signature and therefore signed receipts (56) generally apply only to S/MIME messages that are signed. The recipient or sender of the signed receipt (56) may optionally also encrypt a signed receipt (56) to provide confidentiality between the sender and the recipient.

In order to invoke the signed receipt process, the sender of a message will generally request a signed receipt (56) from the message's recipient (or recipients). Specifically, in accordance with the S/MIME standard, this request is made by adding a "receiptRequest" attribute to the "signedAttributes" field of the "SignerInfo" object of the message for which the signed receipt (56) is requested. The email client of the recipient will typically automatically create a signed receipt (56) when requested to do so, and return the signed receipt (56) in accordance with mailing list expansion options, local security policies, and configuration options.

Figure 3:
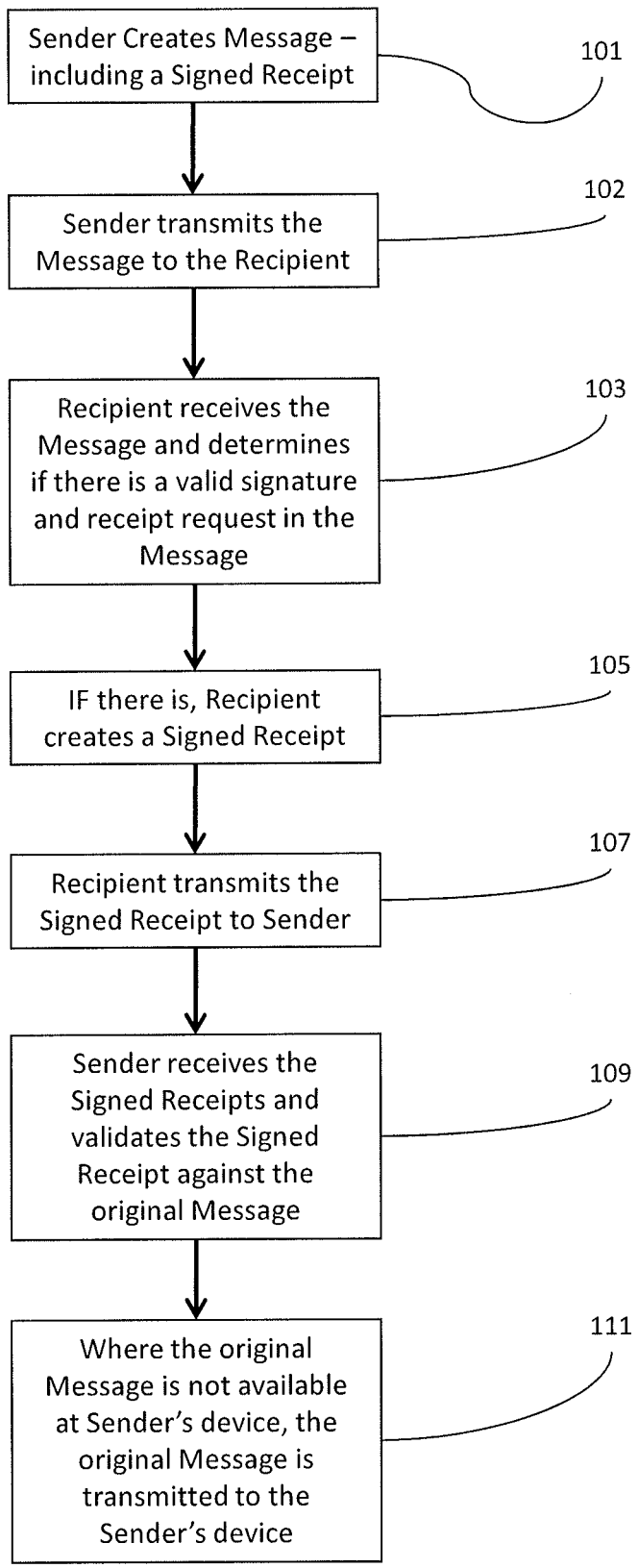
FIG. 3 is a flowchart illustrating a method according to a first aspect of the disclosure.
Figure 4:
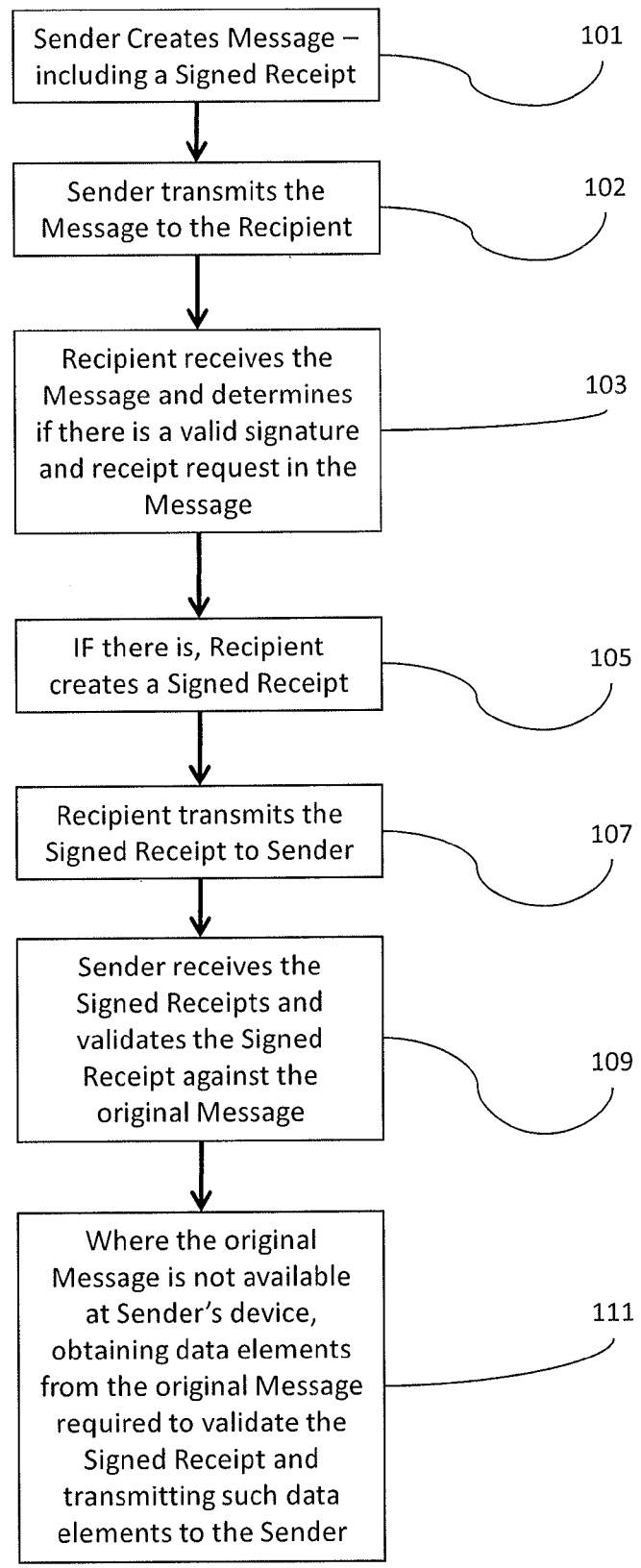
FIG. 4 is a flowchart illustrating a method according to a second aspect of the present disclosure.

Typically the verification of a signed receipt (56) received by a sender involves the following steps, as illustrated in FIGS. 3 and 4:

(a) Sender creates a signed message including a receipt request attribute, which may also be encrypted (Step 101).

(b) Sender transmits the resulting message to the recipient (Step 102).

(c) Recipient receives message and determines if there is a valid signature and receipt request in the message (Step 103).

(d) If there is, then the Recipient creates a signed receipt (Step 105).

(e) Recipient transmits the resulting signed receipt message to the sender (Step 107).

(f) Sender receives the message and validates that it contains a signed receipt for the original message (Step 109). This validation relies on the sender having retained either a copy of the original message or information extracted from the original message.

The present disclosure is concerned in part with Step 109, namely the verification of the signed receipt (56) by the sender and recipient of the signed receipt (56). In particular the present disclosure provides a solution from the device (16) for providing verification of signed receipts (56) where the original message is not available at the device (16). The verification of signed receipts (56) in accordance with the S/MIME standard generally involves: (A) authenticating the content associated with the signed receipt (56), i.e. that the recipient received the original signed data included in the message (referred to herein as "Content Authentication" and (B) authenticating the identity of the recipient, i.e. that it was the recipient that sent the signed receipt (56) (referred to herein as "Recipient Authentication"). In summary, this verification may be generally achieved by comparison of a sender-generated digest value (also referred to as a hash value) and a recipient-generated digest value (attached to the signed receipt (56)) combined with verification of the digital signature associated with the signed receipt (56) so as to prove that the recipient received the exact original of the message that was signed by the sender.

An example of a verification process for signed receipts in accordance with the S/MIME standards published by the Internet Engineering Task Force is set out below:

Content Authentication

1. Decoding the signed receipt (signedData object including the Receipt content).
2. Extracting from the signed receipt the information of sender (specifically extracting the contentType, signedContentIdentifier, and originatorSignatureValue from the decoded Receipt structure to identify the original signedData signerInfo that requested the signedData/Receipt).
3. Acquiring the message signature digest value calculated by the sender to generate the signature value included in the signed receipt (specifically in the signedData signerInfo that requested the signedData/Receipt). If the sender-calculated message signature digest value has been saved locally by the sender, it may be located and retrieved. Otherwise, the message signature digest value is recalculated based on the original message based on the original signedData content and signedAttributes, in a manner that is known.
4. Comparing the message signature digest value calculated by the sender with the signature digest value included in the message and specifically the msgSigDigest signedAttribute included in the signedData/Receipt signerInfo. If these digest values are identical, then this may prove that the message signature digest value calculated by the recipient based on the received original signedData object is the same as that calculated by the sender. This proves that the recipient received exactly the same original signedData content and signedAttributes as sent by the sender because that is the only way that the recipient could have calculated the same message signature digest value as calculated by the sender. If the digest values are different, then the signature verification of the signed receipt may fail.
5. Acquiring the digest value calculated by the sender for the Receipt content constructed by the sender (including the contentType, signedContentIdentifier, and signature value that were included in the original signedData signerInfo that requested the signedData/Receipt). If the sender-calculated Receipt content digest value has been saved locally by the sender, this may be located and retrieved. If the sender-calculated Receipt content digest value has not been saved, then it may be re-calculated. Again, a Receipt structure including the contentType, signedContentIdentifier and signature value that were included in the original signedData signerInfo that requested the signed receipt is obtained. The Receipt structure may then ASN.1 DER (Abstract Syntax Notation One, Distinguished Encoding Rules) encoded, for example, to produce a data stream which is then digested to produce the Receipt content digest value.
6. Comparing the Receipt content digest value calculated by the sender with the value of the message digest included in the signed receipt. If these digest values are identical, then that proves that the values included in the Receipt content by the recipient are identical to those that were included in the original signedData signerInfo that requested the signedData/Receipt. This proves that the recipient received the original signedData signed by the sender, because that is the only way that the recipient could have obtained the original signedData signerInfo signature value for inclusion in the Receipt content. If the digest values are different, then the signedData/Receipt signature verification process may fail.

Recipient Authentication

7. The ASN.1 DER encoded signedAttributes of the signedData/Receipt signerInfo may be digested in a manner that is known.
8. The resulting digest value is then used to verify the signature value included in the signedData/Receipt signerInfo. If the signature verification is successful, then that proves the integrity of the signedData/receipt signerInfo signedAttributes and may authenticate the identity of the signer of the signedData/Receipt signerInfo. Note that the signedAttributes may include the recipient-calculated Receipt content digest value (messageDigest attribute) and recipient-calculated message signature digest value (msgSigDigest attribute). Therefore, the aforementioned comparison of the sender-generated and recipient-generated digest values combined with the successful signedData/Receipt signature verification proves that the recipient received the exact original signedData content and signedAttributes (proven by msgSigDigest attribute) that were signed by the sender of the original signedData object (proven by messageDigest attribute). If the signature verification fails, then the signedData/Receipt signature verification process may fail.

The above described signed receipt verification process can be supported from the device (16) in accordance with a first particular embodiment of the disclosure and also a second particular embodiment of the disclosure described in detail below.

The original message may be accessible from the user's mail account on the message server (22) and the server (10) may be operable to monitor the exchange of S/MIME compliant messages involving the device (16) and to assist in the processing of signed receipts (56) from the device (16). The S/MIME server utility (26) may be operable to identify that an S/MIME message is being redirected to the device (16) that is linked to a signed receipt (56). If the S/MIME server utility (26) detects a signed receipt (56) then it may be operable to determine if the original message is located on the device (16), by operation of a synchronization utility (58) provided by the device program (21) and the server program (12). If the S/MIME server utility (26) establishes that the original message is located on the device (16), then nothing further may be required.

However, if the S/MIME server utility (26) determines that the original message is not on the device (16), then the S/MIME server utility (26), in a first particular embodiment of the present disclosure (illustrated in FIG. 3), may be operable to obtain the original message from the message server (22) by operation of the synchronization utility (58) and transmit the original message to the device (16) (Step 111, FIG. 3). The S/MIME handheld utility (30) is then operable to access information from the header of the original message to verify the signed receipt (56) in accordance with the process particularized above.

In a second particular embodiment of the present disclosure, illustrated in FIG. 4, the S/MIME server utility (26) may be operable to extract from the original message certain data elements required to verify the signed receipt (56), without transferring the original message itself to the device (16). In particular, the S/MIME server utility (26) may be operable to retrieve or calculate, and provide to the device (16) the following data elements if they are not available at the device (16) (Step 114, FIG. 3):

(a) a digital signature linked to the original message, the digital signature may consist of the encrypted hash value of the original message, which when decrypted by the sender's public key proves who signed the message and what was signed ("Sender's Hash Value");

(b) a digital signature linked to the signed receipt, which may consist of a hash value for the original message calculated by the recipient, encrypted with the recipient's private key ("Recipient's Hash Value");

(c) optionally the public key for the recipient, if this is not already accessible from the device (16) (including a new public key if the public key is out of date);

(d) the signed receipt (56); and (e) The hash of the original message for comparison with the hash generated by the Recipient.

The public key of the recipient may be used to decrypt the Recipient's Hash Value, which serves to authenticate the recipient, i.e. that the signed receipt is from the recipient. The Sender's Hash Value is also decrypted and the two hash values mentioned above may be compared. If they are identical, then it may be verified that the signed receipt relates to the same content as the original message because it would be computationally infeasible for the hash value for two different messages to be the same. In this way, the signed receipt may be verified without access to the original message itself.

It should be further understood that if that if the validity of the signed receipt is ever put into question it may be necessary to produce the original message, for example, to re-compute the hash of the original message against the sender's digital signature and the recipient's digital signature.

In a particular implementation of the present disclosure, the server (10) is operable to calculate the above information and append such information to the signed receipt (56), as illustrated in FIG. 4.

The present disclosure refers to a number of different "utilities". This term is meant to convey functions provided by the described computer programs but is not meant to suggest a particular software architecture (or organization of software components), nor is it meant to suggest that a particular utility is separate from any particular computer program or part of any computer program.

FIG. 5 is a block diagram of a communication system which includes the mobile communication device or device (16) described above, which communicates through a wireless communication network (104). FIG. 5 illustrates an example of the device (16) which may include a visual display (112), a keyboard (114), and perhaps one or more auxiliary user interfaces (UI) (116), each of which may be coupled to a controller (106). Controller (106) may also be coupled to radio frequency (RF) transceiver circuitry (108) and an antenna (110).

In most modern communication devices, controller (106) is embodied as a central processing unit (CPU) which runs operating system software in a memory component (not shown). Controller (106) will normally control overall operation of device (16), whereas signal processing operations associated with communication functions may typically be performed in RF transceiver circuitry (108). Controller (106) may interface with device display (112) to display received information, stored information, user inputs, and the like. Keyboard (114), which may be a telephone type keypad or full alphanumeric keyboard, is normally provided for entering data for storage in mobile device (102), information for transmission to network (104), a telephone number to place a telephone call, commands to be executed on device (16), and possibly other or different user inputs.

Device (16) sends communication signals to and receives communication signals from network (104) over a wireless link via antenna (110). RF transceiver circuitry (108) may perform functions similar to those of base station (120), including for example modulation/demodulation and possibly encoding/decoding and encryption/decryption. It is also contemplated that RF transceiver circuitry (108) may perform certain functions in addition to those performed by base station (120). It will be apparent to those skilled in the art that RF transceiver circuitry (108) may be adapted to particular wireless network or networks in which mobile device (102) is intended to operate.

Device (16) may include a battery interface (134) for receiving one or more rechargeable batteries (132). Battery (132) may provide electrical power to (most if not all) electrical circuitry in device (16), and battery interface (132) may provide for a mechanical and electrical connection for battery (132). Battery interface (132) may be coupled to a regulator (136) which regulates power for the device. When mobile device (102) is fully operational, an RF transmitter of RF transceiver circuitry (108) is typically keyed or turned on only when it is sending to network, and is otherwise turned off to conserve resources. Such intermittent operation of transmitter may have a significant effect on power consumption of mobile device (102). Similarly, an RF receiver of RF transceiver circuitry (108) is typically periodically turned off to conserve power until it is needed to receive signals or information (if at all) during designated time periods.

Device (16) may consist of a single unit, such as a data communication device, a cellular telephone, a multiple-function communication device with data and voice communication capabilities, a personal digital assistant (PDA) enabled for wireless communication, or a computer incorporating an internal modem. Alternatively, device (16) may be a multiple-module unit comprising a plurality of separate components, including but in no way limited to a computer or other device connected to a wireless modem. In particular, for example, in the mobile device block diagram of FIG. 5, RF transceiver circuitry (108) and antenna (110) may be implemented as a radio modem unit that may be inserted into a port on a laptop computer. In this case, the laptop computer may include a display (112), a keyboard (114), one or more auxiliary UIs (116), and controller (106) embodied as the computer's CPU. It is also contemplated that a computer or other equipment not normally capable of wireless communication may be adapted to connect to and effectively assume control of RF transceiver circuitry (108) and antenna (110) of a single-unit device such as one of those described above.

Device (16) may operate using a Subscriber Identity Module (SIM) which is connected to or inserted in mobile device (102) at a SIM interface (142). SIM (140) is one type of a conventional "smart card" used to identify an end user (or subscriber) of device (16) and to personalize the device, among other things. Without SIM (140), the device terminal may not be fully operational for communication through wireless network (104). By inserting SIM (140) into device (16), an end user can have access to any and all of his/her subscribed services. In order to identify the subscriber, SIM (140) contains some user parameters such as an International Mobile Subscriber Identity (IMSI). In addition, SIM (140) is typically protected by a four-digit Personal Identification Number (PIN) which is stored therein and known only by the end user. An advantage of using SIM (140) is that end users are not necessarily bound by any single physical mobile device. Typically, the only element that personalizes a mobile device terminal is a SIM card. Therefore, the user can access subscribed services using any mobile device equipped to operate with the user's SIM. SIM (140) generally includes a processor and memory for storing information. SIM and its interfacing standards are well known. For interfacing with a standard GSM device having SIM interface (142), a conventional SIM (140) may have six (6) connections. A typical SIM (140) stores various information such as the IMSI and a preferred network list.

Device (16) communicates in and through wireless communication network (104). In the embodiment of FIG. 5, wireless network (104) operates in accordance with a Global Systems for Mobile (GSM) and General Packet Radio Service (GPRS). Wireless network (104) includes a base station (120) with an associated antenna tower (118), a Mobile Switching Center (MSC) (122), a Home Location Register (HLR) (132), a Serving General Packet Radio Service (GPRS) Support Node (SGSN) (126), and a Gateway GPRS Support Node (GGSN) (128). MSC (122) may be coupled to base station (120) and to a landline network, such as a Public Switched Telephone Network (PSTN) (124). SGSN (126) may be coupled to base station (120) and to GGSN (128), which is in turn coupled to a public or private data network (130) (such as the Internet). HLR (132) may be coupled to MSC (122) and SGSN (126).

Base station (120), including its associated controller and antenna tower (118), provides wireless network coverage for a particular coverage area commonly referred to as a "cell". Base station (120) transmits communication signals to and receives communication signals from mobile devices within its cell via antenna tower (118). Base station (120) normally performs such functions as modulation and possibly encoding and/or encryption of signals to be transmitted to the mobile device in accordance with particular, usually predetermined, communication protocols and parameters, under control of its controller. Base station (120) similarly demodulates and possibly decodes and decrypts, if necessary, any communication signals received from device (16) within its cell. Communication protocols and parameters may vary between different networks. For example, one network may employ a different modulation scheme and operate at different frequencies than other networks.

The wireless link shown in communication system (100) of FIG. 5 represents one or more different channels, typically different radio frequency (RF) channels, and associated protocols used between wireless network (104) and mobile device (102). An RF channel is a limited resource that must be conserved, typically due to limits in overall bandwidth and a limited battery power of device (16). Those skilled in the art will appreciate that a wireless network in actual practice may include hundreds of cells, each served by a distinct base station (120) and transceiver, depending upon desired overall expanse of network coverage. All base station controllers and base stations may be connected by multiple switches and routers (not shown), controlled by multiple network controllers.

Other variations and modifications of the disclosure are possible, examples of which are set out below. It should be understood that the description of the system of the present disclosure may relate to a particular implementation of PKI technology, however, modifications are possible to adapt the disclosure to various other PKI implementations. It is specifically contemplated that the resources of the server (10) including as it relates to support provided verifying signed receipts in accordance with the disclosure be provided on as a hosted solution. All such modifications or variations are believed to be within the sphere and scope of the disclosure as defined by the claims appended hereto.

The invention claimed is:

1. A method of processing security communication protocol compliant signed receipts at a mobile communication device configured for communication with a host system, the host system being operable to send and receive messages, including security communication protocol compliant messages, and to redirect the messages and other data to the mobile communication device, the method being performed by the mobile communication device and comprising:
 (a) receiving from the host system a signed receipt;
 (b) receiving from the host system, if an email message associated with the signed receipt is not available at the mobile communication device, an original email message associated with the signed receipt; and
 (c) verifying the signed receipt based on the original email message.

2. The method of claim 1, wherein the verifying further comprises:
 (a) authenticating message content associated with the signed receipt to message content of the email message; and
 (b) authenticating the recipient.

3. The method of claim 1, wherein the verifying further comprises:
 (a) authenticating that the signed receipt is associated with the email message;
 (b) authenticating that the recipient received the email message; and (c) authenticating that the signed receipt is signed by the recipient.

4. The method of claim 1, further comprising performing a synchronization process with the host system which includes said receiving of the original email message.

5. A method of processing security communication protocol compliant signed receipts at a mobile communication device configured for communication with a host system, the host system being operable to send and receive messages, including security communication protocol compliant messages, and to redirect the messages and other data to the mobile communication device, the method being performed by the mobile communication device and comprising:
  (a) receiving from the host system a signed receipt;
  (b) receiving from the host system, if an email message associated with the signed receipt is not available at the mobile communication device, data elements associated with the email message and required to verify the signed receipt; and
  (c) verifying the signed receipt based on the data elements.

6. The method of claim 5, wherein the data elements are appended to the signed receipt.

7. The method of claim 5, wherein the data elements include:
  (a) a first digital signature associated with the email message that includes an encrypted hash value of the email message, calculated by the mobile communication device, which when decrypted by a public key of the mobile communication device is operable to indicate who signed the message and what was signed; and
  (b) a second digital signature associated with the signed receipt that includes an encrypted hash value for the email message calculated by the recipient, and encrypted with a private key of the recipient.

8. The method of claim 7, wherein the data elements also include optionally a public key of the recipient, if this is not available from the mobile communication device.

9. The method of claim 7, wherein the first digital signature is extracted from the original message.

10. The method of claim 5, wherein the data elements include a hash value of the email message calculated by the mobile communication device.

11. The method of claim 10, wherein the data elements also include a hash value for the email message calculated by the recipient.

12. The method of claim 10, wherein the data elements include a public key of the recipient, if this is not already available at the mobile communication device.

13. The method of claim 10, wherein the data elements include a public key of the recipient, if this is not already available at the mobile communication device.

14. A mobile communication device configured for communication with a host system, the host system being operable to send and receive messages, including security communication protocol compliant messages, and to redirect the messages and other data to the mobile communication device, the mobile communication device comprising:
  a controller operable to:
  (i) receive from the host system a signed receipt;
  (ii) receive from the host system, if an email message associated with the signed receipt is not available at the mobile communication device, an original email message associated with the signed receipt; and
  (iii) verify the signed receipt based on the original email message.

15. The mobile communication device of claim 14, wherein the controller is further operable to:
  (a) authenticate message content associated with the signed receipt to message content of the email message; and
  (b) authenticate the recipient.

16. The mobile communication device of claim 14, wherein the controller is further operable to:
  (a) authenticate that the signed receipt is associated with the email message;
  (b) authenticate that the recipient received the email message; and
  (c) authenticate that the signed receipt is signed by the recipient.

17. The mobile communication device of claim 14, wherein the receiving of the original email message is performed through a synchronization process with the host system.

18. A mobile communication device configured for communication with a host system, the host system being operable to send and receive messages, including security communication protocol compliant messages, and to redirect the messages and other data to the mobile communication device, the mobile communication device comprising:
  a controller operable to:
  (i) receive from the host system a signed receipt;
  (ii) receive from the host system, if an email message associated with the signed receipt is not available at the mobile communication device, data elements associated with the email message and required to verify the signed receipt; and
  (iii) verify the signed receipt based on the data elements.

19. The mobile communication device of claim 18, wherein the data elements are appended to the signed receipt.

20. The mobile communication device of claim 18, wherein the data elements include:
  (a) a first digital signature associated with the email message that includes an encrypted hash value of the email message, calculated by the mobile communication device, which when decrypted by a public key of the mobile communication device is operable to indicate who signed the message and what was signed; and
  (b) a second digital signature associated with the signed receipt that includes an encrypted hash value for the email message calculated by the recipient, and encrypted with a private key of the recipient.

21. The mobile communication device of claim 20, wherein the data elements also include optionally a public key of the recipient, if this is not available from the mobile communication device.

22. The mobile communication device of claim 20, wherein the first digital signature is extracted from the original message.

23. The mobile communication device of claim 18, wherein the data elements include a hash value of the email message calculated by the mobile communication device.

24. The mobile communication device of claim 23, wherein the data elements also include a hash value for the email message calculated by the recipient.

25. A non-transitory computer readable medium having computer readable program code for processing security communication protocol compliant signed receipts by a mobile communication device, the mobile communication device being in communication with a host system that sends and receives messages, including security communication protocol compliant messages, and redirects the messages and other data to the mobile communication device, the computer readable program code including code for:

(a) receiving from the host system a signed receipt;
(b) receiving from the host system, if an email message associated with the signed receipt is not available at the mobile communication device, an original email message associated with the signed receipt or data elements associated with the email message and required to verify the signed receipt; and
(c) verifying the signed receipt based on the original email message or the data elements.

* * * * *

UNITED STATES PATENT AND TRADEMARK OFFICE
CERTIFICATE OF CORRECTION

PATENT NO.      : 8,429,413 B2
APPLICATION NO. : 13/118513
DATED           : April 23, 2013
INVENTOR(S)     : Michael K. Brown et al.

It is certified that error appears in the above-identified patent and that said Letters Patent is hereby corrected as shown below:

In the Claims

Column 15
Claim 13 should be deleted.
At Claim 14, line 52, "14" should read --13--.
At Claim 15, line 66, "15" should read --14--; and
Claim 15, line 66, "14" should read --13--.

Column 16
At Claim 16, line 5, "16" should read --15--; and
Claim 16, line 5, "14" should read --13--.
At Claim 17, line 13, "17" should read --16--; and
Claim 17, line 13, "14" should read --13--.
At Claim 18, line 17, "18" should read --17--.
At Claim 19, line 31, "19" should read --18--; and
Claim 19, line 31, "18" should read --17--.
At Claim 20, line 33, "20" should read --19--; and
Claim 20, line 33, "18" should read --17--.
At Claim 21, line 45, "21" should read --20--; and
Claim 21, line 45, "20" should read --19--.
At Claim 22, line 49, "22" should read --21--; and
Claim 22, line 49, "20" should read --19--.
At Claim 23, line 52, "23" should read --22--; and
Claim 23, line 52, "18" should read --17--.
At Claim 24, line 55, "24" should read --23--; and
Claim 24, line 55, "23" should read --22--.
At Claim 25, line 58, "25" should read --24--.

Signed and Sealed this
Twenty-fourth Day of December, 2013

Margaret A. Focarino
*Commissioner for Patents of the United States Patent and Trademark Office*